(12) United States Patent
Burkovskiy

(10) Patent No.: US 7,043,866 B2
(45) Date of Patent: May 16, 2006

(54) FISHING DEVICE

(76) Inventor: Igor Burkovskiy, 16 Oakdale Rd., Denville, NJ (US) 07834

( * ) Notice: Subject to any disclaimer, the term of this patent is extended or adjusted under 35 U.S.C. 154(b) by 1088 days.

(21) Appl. No.: 09/735,577

(22) Filed: Dec. 14, 2000

(65) Prior Publication Data

US 2005/0097809 A1    May 12, 2005

(51) Int. Cl.
*A01K 69/00* (2006.01)
*A01K 71/00* (2006.01)

(52) U.S. Cl. .............................. 43/7; 43/100
(58) Field of Classification Search ............... 43/100, 43/103, 105, 7, 8, 9.7, 10
See application file for complete search history.

(56) References Cited

U.S. PATENT DOCUMENTS

| | | | | |
|---|---|---|---|---|
| 99,713 A | * | 2/1870 | Sabins | 43/105 |
| 1,262,507 A | * | 4/1918 | Johnston | 43/105 |
| 1,403,171 A | * | 1/1922 | Koenig | 43/105 |
| 3,300,890 A | * | 1/1967 | Thomassen | 43/100 |
| 3,427,742 A | * | 2/1969 | Brown | 43/100 |
| 4,141,172 A | * | 2/1979 | Prosol | 43/105 |
| 4,237,646 A | * | 12/1980 | Mims, III | 43/103 |
| 4,587,758 A | * | 5/1986 | Ponzo | 43/102 |
| 4,652,246 A | * | 3/1987 | Thorgeirsson et al. | 441/80 |
| 5,237,768 A | * | 8/1993 | Kiekhafer et al. | 43/4.5 |
| 5,842,304 A | * | 12/1998 | Rivera | 43/105 |
| 6,247,264 B1 | * | 6/2001 | Prosol | 43/100 |

\* cited by examiner

*Primary Examiner*—Teri Pham Luu
*Assistant Examiner*—Susan C. Alimenti
(74) *Attorney, Agent, or Firm*—Elya Zborovsky

(57) ABSTRACT

A fishing device has a substantially rigid lower member, a lee attached to the lower member, and a net having a lower end attached to the lower member and an upper end vertically spaced from it, the net being slidable over the lee so that when fish hits the net the net slides over the lee and forms a bag in which fish is caught.

1 Claim, 1 Drawing Sheet

FISHING DEVICE

BACKGROUND OF THE INVENTION

The present invention relates generally to fishing devices.

Fishing devices are known and formed as hooks attachable to lees. The use of hooks injures fish during fishing, since the hook tears a fish mouth and frequently engages fish body. It usually kills small fish. The fish which is not killed but just damaged frequently becomes sick if it remains in water and transmits infections to other fish.

SUMMARY OF THE INVENTION

It is therefore an object of present invention to provide a fishing device which avoids the disadvantages of the prior art.

In keeping with these objects and with others which will become apparent hereinafter, one feature of present invention resides, briefly stated in fishing device which has, a substantially rigid lower member; a lee attached to said lower member; and a net having a lower end attached to said lower member and an upper end vertically spaced from it, said net being slidable over said lee so that when fish hits said net said net slides over said lee and forms a bag in which fish is caught.

When the fishing device is designed in accordance with the present invention, it avoids the disadvantages of the prior art. The small fish can not be killed by the fishing device. The fish which is not caught is not injured and therefore does not get sick and does not spread infections. The device is also easy and simple to manufacture.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
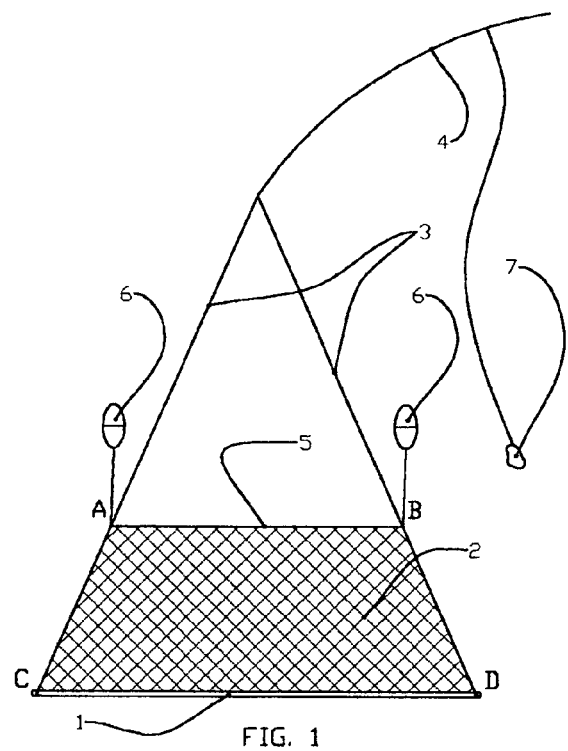
FIG. 1 is a view showing a fishing device in accordance with the present invention in an inoperative position.

A fishing device in accordance with the present invention has a substantially rigid lower element which can be formed for example as a solid bar 1 provided with openings C and D on its both ends. A net or a net screen 2 is connected with the bar 1 at its widest side. The bar 1 can go through the net and is attached to the ends of the net. Side lees 3 which extend from a base lee going to a fishing rope are also attached with their lower ends to the lower solid bar 1 by the openings C and D. The side lees 3 extend through the side of the net screen 2 so that the net screen can slide over the side lees up and down. This can be done by looping the net 2 at the sides around the side lees 3. The connecting lee 5 can be located at a top part end of the net screen 1. In the points A and B the connecting lee 5 has loops through which the side lees 3 are passed. As a result, the net screen 2 can move downwardly around the side lees 3.

Figure 2:
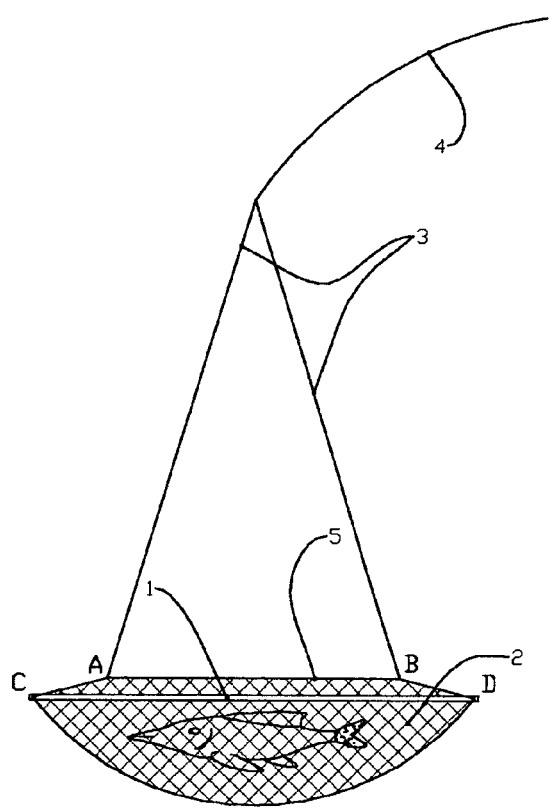
FIG. 2 is a view showing the inventive fishing device in which a fish is caught.
Figure 3:
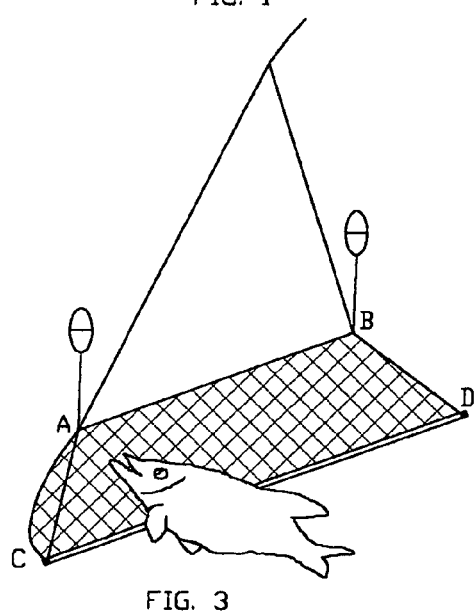
FIG. 3 is a view showing schematically how fish interacts with the inventive fishing device.

When the fish gets in contact with the net screen 2 it pulls the top part of the net screen down, and a distance between the lines A, B and C, D is reduced so that a bag is formed by the net screen in which the fish is caught as shown in FIG. 2. A fisher man then pulls out the fish, extends the bag formed in FIG. 2 to the initial condition of the net screen 2 shown in FIG. 1 and releases the fish.

In accordance with the present invention floats 4 can be attached to the opposite ends of the upper side of the net screen for example in the points A and B so as to holds the nets 3 in a vertical position. Also, a bait 7 can be attached either to the main lee 4 or to the net screen 2 or to the other parts of the device.

It will be understood that each of the elements described above, or two or more together, may also find a useful application in other types of constructions differing from the types described above.

While the invention has been illustrated and described as embodied in fishing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A fishing device, comprising a substantially rigid lower member; a line attached to said lower member; a net having a lower end attached to said lower member and an upper end vertically spaced from said lower member, said net being slidable over said line so that when fish hits said net said net slides over said line and forms a bag in which fish is caught; and floats means for holding said net in a substantially vertical position, said float means including two floats attached to said net at said upper end and spaced from one another horizontally said line including two line members connected to opposite ends of said lower member and both connected to a main line; a connecting line which extends substantially horizontally at said upper end of said net and has two horizontally spaced points, said two floats being attached to said net in said horizontally spaced points of said connecting line, wherein said connecting line in said horizontally spaced points is provided with loops through which said two line members pass.

* * * * *